March 9, 1965 E. ROLLMAN ETAL 3,172,157
MOLD FOR MANUFACTURE OF FOOTWEAR
Original Filed Aug. 15, 1957 2 Sheets-Sheet 1

INVENTORS
ERNEST ROLLMAN
ANTON LIEBSCHER AND
ANDREW SZERENYI

BY
ATTORNEY

March 9, 1965 E. ROLLMAN ETAL 3,172,157
MOLD FOR MANUFACTURE OF FOOTWEAR
Original Filed Aug. 15, 1957 2 Sheets-Sheet 2

INVENTORS
ERNEST ROLLMAN
ANTON LIEBSCHER AND
ANDREW SZERENYI
BY
Doo J. Hatfield
ATTORNEY

United States Patent Office 3,172,157
Patented Mar. 9, 1965

3,172,157
MOLD FOR MANUFACTURE OF FOOTWEAR
Ernest Rollman, Anton Liebscher, and Andrew Szerenyi, Waynesville, N.C.,
Original application Aug. 15, 1957, Ser. No. 678,412, now Patent No. 3,098,308, dated July 23, 1963. Divided and this application Sept. 17, 1962, Ser. No. 224,608
6 Claims. (Cl. 18—17)

This application is a division of application Serial No. 678,412, filed August 15, 1957, which has issued as Patent No. 3,098,308, granted July 23, 1963.

The invention refers to the apparatus for the manufacture of molded articles such as soles and heels molded directly onto uppers of shoes.

One object of the invention is to provide a device which allows the molding of the sole and heel to uppers be they with or without welt and with or without insole, i.e., lasted or not lasted. Other objects of the invention refer to improvements in the methods of manufacture and to improvements in the article, as described hereafter in connection with drawing.

Figure 1:
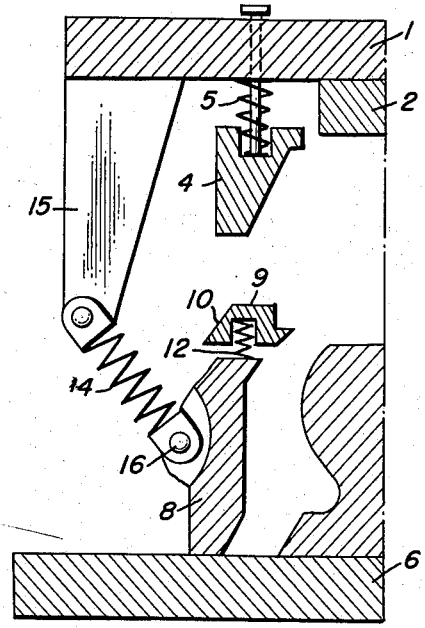
Figure 2:
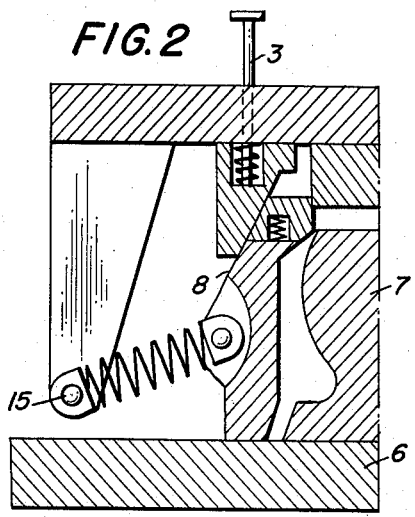
Figure 3:
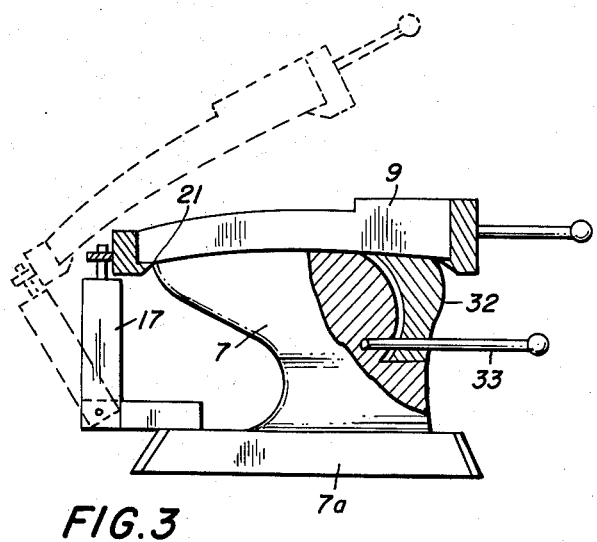
Figure 4:
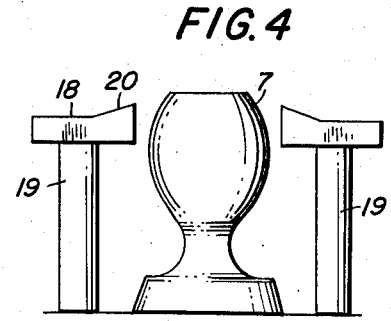
Figure 5:
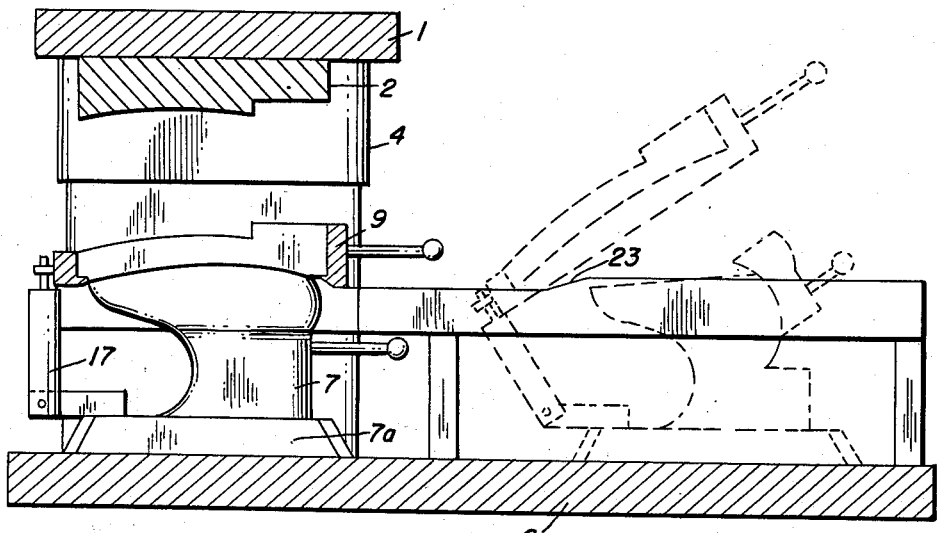
Figure 6:
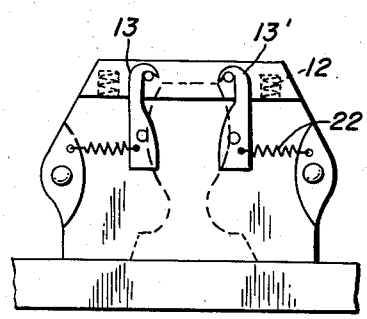
Figure 7:
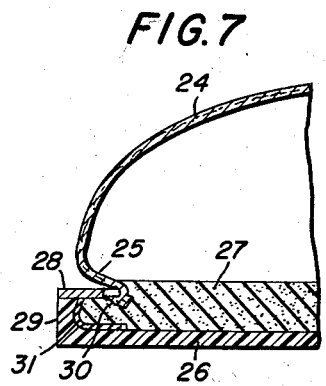

The drawing shows in FIG. 1 the molding apparatus according to the invention in a cross section in the open position, while FIG. 2 shows the same device in the closed position; in both views for the sake of clarity the shoe itself with the sole is not shown. FIG. 3 shows a side view of the last forming part of the molding device, while FIG. 4 shows a front view of the last with the guides for the frame. FIG. 5 shows another arrangement of guides in a side view presenting the molding and the unloading position. FIG. 6 shows a front view of the frame with latches holding it against the frame carrier. FIG. 7 shows a cross section of a shoe made in the device according to the invention.

The molding device according to the invention comprises an upper platen 1 which carries a piston like sole bottom plate 2 and by means of pull rods 3 a clamp 4. Springs 5 between the platen 1 and the clamp 4 allow the clamp to move downwards ahead of the platen.

The other platen 6 supports a last 7 having a base 7a, a divided frame carrier 8, and a frame 9. The frame parts 9 are provided on the outside with tapered surfaces 10, matching tapered surfaces 11 on the inside of the clamp 4. It is preferred to hold the angle of these surfaces 10, 11, so small as to make these surfaces self-locking.

For the manufacture of certain types of footwear with prelasted uppers springs 12 are provided between the frame parts 9 and the frame carrier 8, which tend to lift the frame up, away from the frame carrier and from the last 7 and latches 13 and 13' are provided to hold the frames down to the frame carrier until the molded sole is free of the frame. The movement of the frame carrier parts 8, 8' to and from each other is obtained through links 14, hinged on one end to extensions 15 of the platen 1, on the other end to pins 16 of the frame carriers. The links consist of stiff coil springs which transmit either pressure during the closing or tension during the opening of the molds.

For the manufacture of shoes which are lasted within the molding device, the upper to which a welt has been stitched, is placed upon the last shown in FIG. 3. The frame 9, carried by the lever 17 can now be opened and moved below the welt into a substantially horizontal position, where the frame halves are supported by the lower part 18 of the guides 19. As the frame halves are closed while moving closer to the upper on the last, the inclined surfaces 20 of the guides 19 will automatically lift the frame so that the completely closed frame sits exactly at the desired final level without special attention or skill on the part of the operator. The material for the sole and heel can now be placed into the mold cavity formed by the last and the frame and this assembly be moved into the molding position between the platens 1 and 6 as shown in FIG. 1. Thereafter the movement of the platens begins, caused usually by the opening of a valve in a hydraulic circuit.

As the downwards movement of the platen 1 begins, the springs 14 force the frame carrier havles against each other, bringing with it a preliminary closing of the frame halves. While the frame carrier comes now to a standstill, the movement of the platent continues (under compression of the springs 14). The tapered surfaces of the clamp come now into contact with the corresponding surfaces of the frame halves and force them together and lock them so as to pre-stress the divided frame against the pressure of the rubber during the molding, which tends to separate the frame parts and tends to cause unsightly spew lines. In the manufacture of shoes with pre-welted uppers, the springs 12 between frame and frame carrier are not inserted, so that the frame parts rest directly on the frame carrier. The clamp 4 now also comes to rest, but the platen continues its downward movement and forces now the sole bottom plate 2 into the mold cavity, thereby molding sole and heel under heavy pressure onto the upper and welt. When the desired end position is reached—and after holding it for any desired curing time—the movement of the platen is reversed.

After holding the platen 1 and with it the sole bottom plate 2 in position to complete the cure or vulcanization, the movement of the platen starts again. As might be seen from FIG. 2, the hinge points 15 of the springs are moving during the molding cylcle even below the level of the hinge points 16 on the frame carrier, without danger that the frame carrier halves might separate. The use of springs between the hinge points also allows a very compact design of the molding device even with a relatively long stroke of the platen. As the platen 1 moves upwards, the sole bottom plate will separate itself from the molded sole and thereafter the clamp 4 will free itself from the frame. Only thereafter, assured by the timing springs 14, will the frame carrier halves separate, so that the last can be moved from the molding position onto the apron of the device. The frame is then still closed and held between the lower edge of the upper and the welt. The frame can now be opened and swings away from the last as shown in FIG. 3. The completed shoe can be removed and the cycle repeated.

If the device according to the invention is to be used for shoes without welt, the lever 17 is eliminated and the frame halves located on the respective halves of the frame carrier. In addition, springs 12 between the frame halves and the frame carrier and latches 13 are provided, as shown in FIG. 6. These springs hold the frame halves slightly above the level of contact between their lip 21 and the upper, until the frame carriers closed the frame. This eliminates any danger of scraping or otherwise damaging the upper during closing. Only after the clamp has locked the frame halves together—but before the sole bottom plate exerted any pressure on the sole material—will the continued movement of the platen cause a compression of the springs 12 and bring the lip (after a movement in the press direction) to rest on the upper. As this position is reached the latches 13 come into action, helped by tension springs 22, and hold the frame down even after the clamp 4 lifts and the downwards pressure ceases. The frame halves with the respective frame carrier will move, after the completion of the molding, horizontally away from the shoe without danger of tearing the sole from the upper. After the last with the shoe is moved into the loading position away from the frame, the latches can be freed by hand so that the frames are ready for the next molding cycle. The guides 19, as described before, are used to move the frame prior to the molding in addition to their normal (horizontal) closing movement also in a direction vertically thereto. The inclined surfaces of the guides might be in action during the closing of the frame, as shown in FIG. 4, or the guides might be used to move the already closed frame while moving the frame with the last from the loading position into the molding position, as shown in FIG. 5. There the inclined surfaces 23 are arranged to lower the frame towards the last as the latter moves into the molding position. The movement might be in either case a lifting or lowering to suit the requirements of the shoe bottom. The fact that, according to the invention, the frame carriers close before the frame presses against the upper on the last is used, as a further improvement, to assure correct location of the frame in relation to the last. This is obtained, as might be seen from FIGS. 1 to 3, by providing tapered surfaces at the foot of the last, and mating surfaces of the frame carrier halves. As the latter close, they will move the last into exactly the desired position in relation to the frame. The time delay assured by the springs 14 permits this to happen before the frame is pushed downwardly against the upper on the last. While the inclination of the tapered surfaces as shown secures only the positioning of the last in a horizontal plane it is obvious that such tapered surfaces can also be used to secure the positioning in a vertical direction of the last in relation to the frame.

It is preferred to use, for the manufacture of shoes to be lasted in the vulcanization device, a last with a movable heel piece, as shown in FIG. 3. The dividing surface between the last 7 and the heel piece 32 is cylindrical so that in the foreshortened as well as in the stretched position there is no gap between the heel piece and the adjoining parts of the last, which might tend to mark on the upper. A cantilever 33 is arranged to permit the exertion of considerable force when stretching the upper by pushing the heel piece into place.

The molding device described above permits two molding positions of the sole bottom plate, an initial position with very high pressure, close to the last, and a second position corresponding to the desired final thickness of the sole, still without essential loss of pressure. The initial molding and curing causes the formation of a solid sole shell, while the expansion of the mold cavity by the forementioned partial lifting of the sole bottom plate and holding there permits the formation of a porous mass in the center of the sole. This is helped by filling the mold with a mix for a porous rubber wrapped in sheets of a mix for non-porous rubber. This permits the further improvement of the shoes according to the invention in that an outer shell of solid, relatively hard elastomer and an inner sole of softer material can be integrally molded. The sole shell will adhere to the upper as it is molded thereto under high pressure. As shown in the cross section in FIG. 7 a sole shell 26 including also the side rim 29 is integrally molded to the upper 24 with the welt 28. The material of the inner part of the sole might be the same as used for the outer shell, but with the addition of one of the many known blowing agents so as to facilitate the expansion thereof after the outer sole shell has hardened. A strip 31 of pre-vulcanized rubber is used to contain the porous rubber filler 27 during the flow of the rubber mix for the sole shell. By blowing the filler and vulcanizing it before the molding flow of the material of the sole shell has ended, it is possible to obtain in a single operation a fully resilient sole with a fully molded sole shell without weakening of the lower sole edge which is subjected to heavy wear. In other instances it might be preferred to use some less expensive mix for the inner part of the sole such as regenerated rubber with light weight filler, so as to reduce the weight of the completed sole.

The design of the molding device according to the invention as described above, more specifically the clamp fastened to the platen and the springs to bring the hinge points for the frame carrier to or even beyond level allow the use of much higher pressures than hitherto used without distortion of the frames and unsightly spew lines.

What we claim is:

1. A device for molding shoe soles to shoe uppers comprising first and second platens, a last supported by said first platen, a divided side frame, first means connecting said divided side frame to said last, a frame carrier supported by said first platen, second means operated by said second platen to move said frame carrier toward and away from said last to close and open said divided side frame when said side frame is in closed position, third frame when said side frame is in closed position, third means connected to said second platen to exert additional pressure on said side frame when in closed position and a sole plate connected to said second platen.

2. A device for molding shoe soles as set forth in claim 1 further characterized in that said second means includes a resilient element.

3. A device for molding shoe soles as set forth in claim 1 further characterized in that said first means includes an arm having one end pivotally connected to said last and the other end pivotally connected to said side frame.

4. A device for molding shoe soles as set forth in claim 3 wherein the pivotal connection between said other end of said arm and said side frame is slidable.

5. A device for molding shoe soles as set forth in claim 1 further including spring means between said frame carrier and said divided side frame.

6. A device for molding shoe soles as set forth in claim 1 further characterized in that said last is slidable on said first platen from a position under said second platen to a position outwardly from said second platen, and guide means on said first platen for raising said side frame when said last is in its outward position and for lowering said side frame when said last is under said second platen.

References Cited by the Examiner

UNITED STATES PATENTS

| 1,143,769 | 6/15 | Leonard | 25—121 |
| 2,178,086 | 10/39 | Szerenyi | 18—17 |
| 2,221,742 | 11/40 | Hoza | 18—17 |
| 2,553,999 | 5/51 | Bonovsky | 18—17 |
| 2,820,251 | 6/58 | Frazer | 18—34 |
| 2,907,068 | 10/59 | Vdolek | 18—17 |
| 2,913,766 | 11/59 | Haller | 18—34 |

FOREIGN PATENTS

| 1,264,686 | 5/61 | France. |
| 563,964 | 6/57 | Italy. |
| 91,796 | 3/38 | Sweden. |

MICHAEL V. BRINDISI, *Primary Examiner.*

UNITED STATES PATENT OFFICE
CERTIFICATE OF CORRECTION

Patent No. 3,172,157　　　　　　　　　　　　　　　　March 9, 1965

Ernest Rollman et al.

It is hereby certified that error appears in the above numbered patent requiring correction and that the said Letters Patent should read as corrected below.

In the grant, lines 1 and 2, for "Ernest Rollman, Anton Liebscher, and Andrew Szerenyi, of Waynesville, North Carolina," read -- Ernest Rollman, Anton Liebscher, and Andrew Szerenyi, of Waynesville, North Carolina, assignors to Ro-Search, Inc., of Waynesville, North Carolina, --; lines 11 and 12, for "Ernest Rollman, Anton Liebscher, and Andrew Szerenyi, their heirs" read -- Ro-Search, Inc., its successors --; in the heading to the printed specification, lines 3 and 4, for "Ernest Rollman, Anton Liebscher, and Andrew Szerenyi, Waynesville, N. C." read -- Ernest Rollman, Anton Liebscher, and Andrew Szerenyi, Waynesville, N. C., assignors to Ro-Search, Inc., Waynesville, N. C. --.

Signed and sealed this 21st day of September 1965.

(SEAL)
Attest:

ERNEST W. SWIDER　　　　　　　　　　　　　　　　EDWARD J. BRENNER
Attesting Officer　　　　　　　　　　　　　　　　Commissioner of Patents